United States Patent [19]
Kody

[11] Patent Number: 5,452,140
[45] Date of Patent: Sep. 19, 1995

[54] MIRROR HOLDER

[76] Inventor: Louise B. Kody, 733 Sea Pines La., Las Vegas, Nev. 89107

[21] Appl. No.: 275,943

[22] Filed: Jul. 14, 1994

[51] Int. Cl.⁶ .................. G02B 7/182; G02B 5/08; G02B 7/18; A47K 1/08
[52] U.S. Cl. .................. 359/871; 248/467; 248/489; 359/879; 359/862; 359/860
[58] Field of Search .......... 248/214, 489, 467, 490, 248/497; 359/509, 845, 865, 871, 879, 860, 862

[56] References Cited

U.S. PATENT DOCUMENTS

| | | | |
|---|---|---|---|
| 1,079,989 | 12/1912 | Lea | 248/489 |
| 3,195,616 | 7/1965 | Taber | 160/121.1 |
| 3,327,419 | 6/1967 | Stanos | 40/124 |
| 3,853,226 | 12/1974 | Hine et al. | 211/104 |
| 4,220,309 | 9/1984 | Eisen et al. | 248/467 |
| 4,712,892 | 12/1987 | Masucci | 359/871 |
| 4,902,118 | 2/1990 | Harris | 246/23 |
| 4,950,065 | 8/1990 | Wyman | 359/871 |
| 5,042,770 | 9/1994 | Loutham | 248/214 |
| 5,103,347 | 9/1994 | Lumbra et al. | 248/489 |
| 5,285,321 | 2/1995 | Nolan-Brown | 359/857 |

*Primary Examiner*—Paul M. Dzierzynski
*Assistant Examiner*—Mohammad Y. Sikder
*Attorney, Agent, or Firm*—Quirk & Tratos

[57] ABSTRACT

A mirror and holder, and method of using the same, is provided for supporting and protecting a mirror. In particular, the holder comprises an elongate strap having a first weighted end and a length of hook and loop type fastening means on one side. A user may hang the strap from a door or ledge, or roll it up into a coil by locating the first end of the strap on said ledge or over said door. The mirror includes a first side with a reflective surface, and a second side having mating hook and loop type fastening means. A user can removably attach the mirror to the strap anywhere along the length of the strap for use when the strap is suspended from a door or the like, or can use the mirror on a flat surface by attaching it to the coiled up strap. A user may also wind the Strap around the mirror to protect the mirror during transport.

12 Claims, 4 Drawing Sheets

MIRROR HOLDER

FIELD OF THE INVENTION

The present invention relates to a device for supporting a mirror for use. In particular, the present invention relates to a device for suspending a mirror from a door, or supporting a mirror for use on a flat surface.

BACKGROUND OF THE INVENTION

No convenient means exists for temporarily mounting or supporting a mirror on a door or flat surface. This is particularly inconvenient for travelers, who often find it desirable to carry mirrors with them for use in their hotel rooms, recreational vehicles, or offices.

The mirror that travelers take with them is not a permanent fixture of the hotel room and thus the traveler requires a convenient means for mounting the mirror in the room for use. Many travelers supplement the single wall mirror in the bathroom with another mirror to allow them to see the back of their head or the like. Presently, the only way the traveler can accomplish this is by holding the mirror in one hand and performing the given task, such as combing his hair, with the other hand. This is often quite difficult, and depending on the size of the mirror and the time that the user holds the mirror in place, can be an exhausting ordeal.

Further, conventional mounting methods are simply not available to a traveler or other mirror user in these situations. For example, mounting the mirror on a door with a nail, screw, or other permanent bracket is not permissible. Other less permanent mounting means, such as tape or other adhesives, do not allow repeated mounting of a mirror without the need to repair or maintain the device.

A few less intrusive means for mounting a mirror exist, but do not provide means for adjusting the position of the mirror for use. For example, a user might mount a mirror on a steel bracket connected to the top of a door. A user of a mirror mounted in this fashion, however, cannot adjust the mirror to a variety of given heights. Height adjustment is necessary if the traveler wishes to use the mirror when standing or sitting, or if there is a difference in height between different travelers using the same mirror.

Most users also wish to mount the mirror to the door for use, but do not want to remove and re-install the mirror every time the door to which it is connected is open and shut. Travelers often also wish to use the mirror at a desk or table within the room or in other locations where the traveler cannot hang the mirror but must rest it directly on a flat surface. In those instances, support of the mirror in the correct orientation requires a stand or other support.

Further, when a traveler takes a mirror of sufficient size to be useful on a trip, the mirror is often broken. Such mirrors are often difficult to pack or protect, especially when stored in luggage that is thrown about the storage compartment of an airliner.

Summary of the Invention

A mirror and holder for use in supporting the mirror are provided in accordance with the present invention. The mirror holder generally comprises an elongate strap of material having first and second ends and a first and second side. Weights are located in small pockets in the first end of the strap. The mirror is of a standard type, having a first side and second side, at least one of which is reflective.

The mirror is attached to the holder by interengaging fastening means, such as a hook and loop material, located on the first side of the strap, and interengaging fastening means, such as mating hook and loop material located on the rear side of the mirror. A small section of fastening material is also located on the second side of the strap near the second end.

If a user wishes to mount the mirror on a door, the user places the first end of the holder over the top of the door and allows the remainder of the holder to hang toward the ground. The user then attaches the mirror to the holder with the interengaging fastening means. The user may adjust the vertical height of the mirror simply by attaching the mirror to the strap anywhere along its length.

If the user wishes to hang the mirror but there is no door nearby, a use simply places the first end of the holder on any flat surface, such as a window sill, counter, or bookshelf. The user then attaches and positions the mirror as described above.

Advantageously, the user may also mount the mirror directly on a flat surface. The user simply coils the strap, starting from the first end with the first side facing down. Once the strap is coiled, the interengaging fastening means at the second end of the strap engages the fastening means on the first side of the strap, securing the strap in a coiled position. The user sets this coiled up strap on a table or other flat surface, and then attaches the mirror to it in the desired position.

The holder protects the mirror in storage and transport. In particular, a user may coil the strap around the mirror. In this position, the mirror is located inside of a cushion of material, preventing it from being broken when not being used.

Further objects, features, and advantages of the present invention will become apparent from the detailed description of the drawings that follows, when considered with the attached figures.

Detailed Description of the Preferred Embodiment

Figure 1:
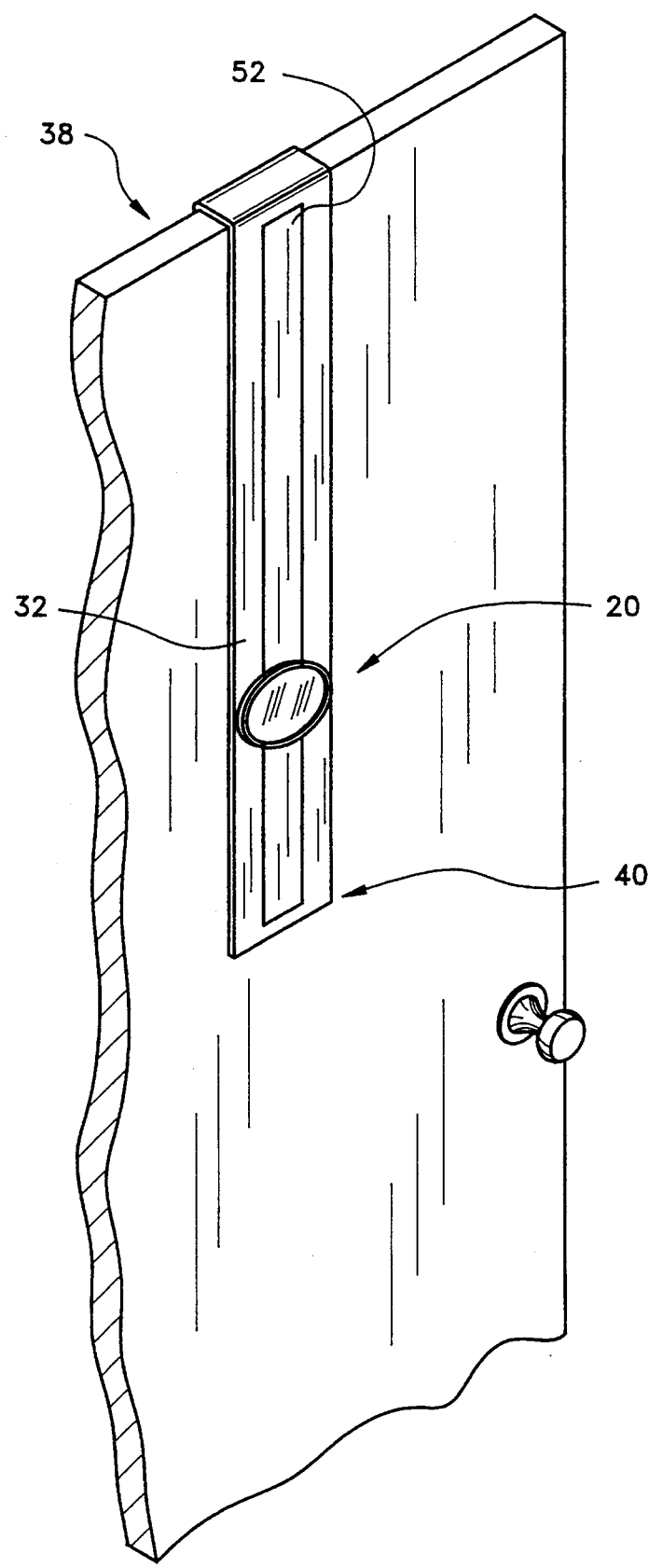
FIG. 1 is a perspective view of a mirror holder and mirror of the present invention placed on a door.

FIG. 1 illustrates a mirror 20 located on a holder 22 of the present invention. The mirror 20 may be of any type, including standard commercially available types. As described in more detail below, the mirror 20 preferably weighs between 1 and 4 ounces, and most preferably about 2 ounces, when used with the preferred holder 22 described herein.

Figure 2:
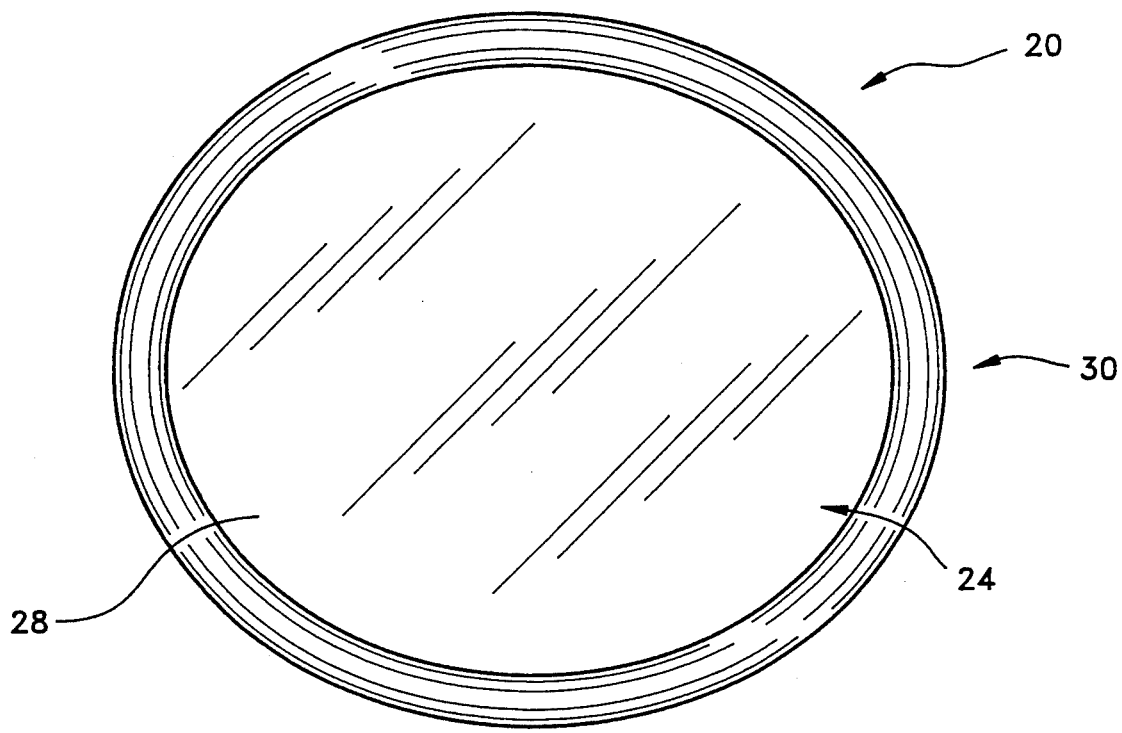
FIG. 2 is a front view of a mirror for use with the holder of the present invention.
Figure 3:
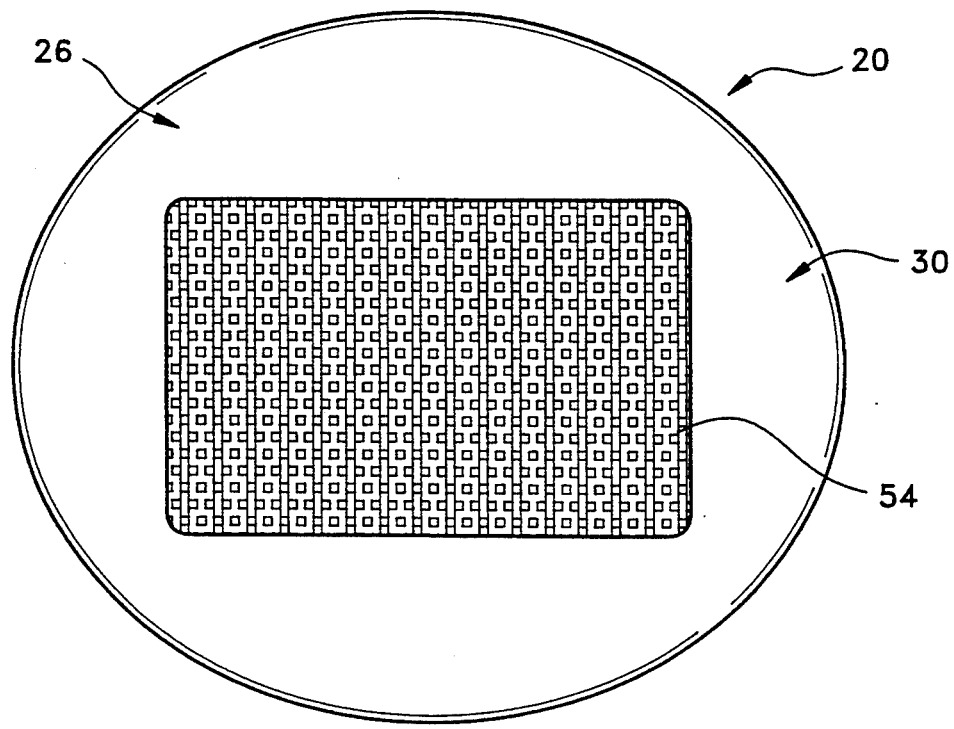
FIG. 3 is a rear view of the mirror of FIG. 2.

As illustrated in detail in FIGS. 2 and 3, the mirror 20 comprises a base 30 having a first side 24 and second or rear side 26. The base 30 may comprise a rigid metal or plastic member, and is preferably thin and flat on each side. The first side 24 of the mirror 20 comprises a reflective member 28 connected to the base 30. The second side 26 of the mirror 20 may be a reflective or magnifying surface. Preferably, when the member 28 is a thin mirror, the mirror is glued to the flat side of the base 30.

Figure 4:
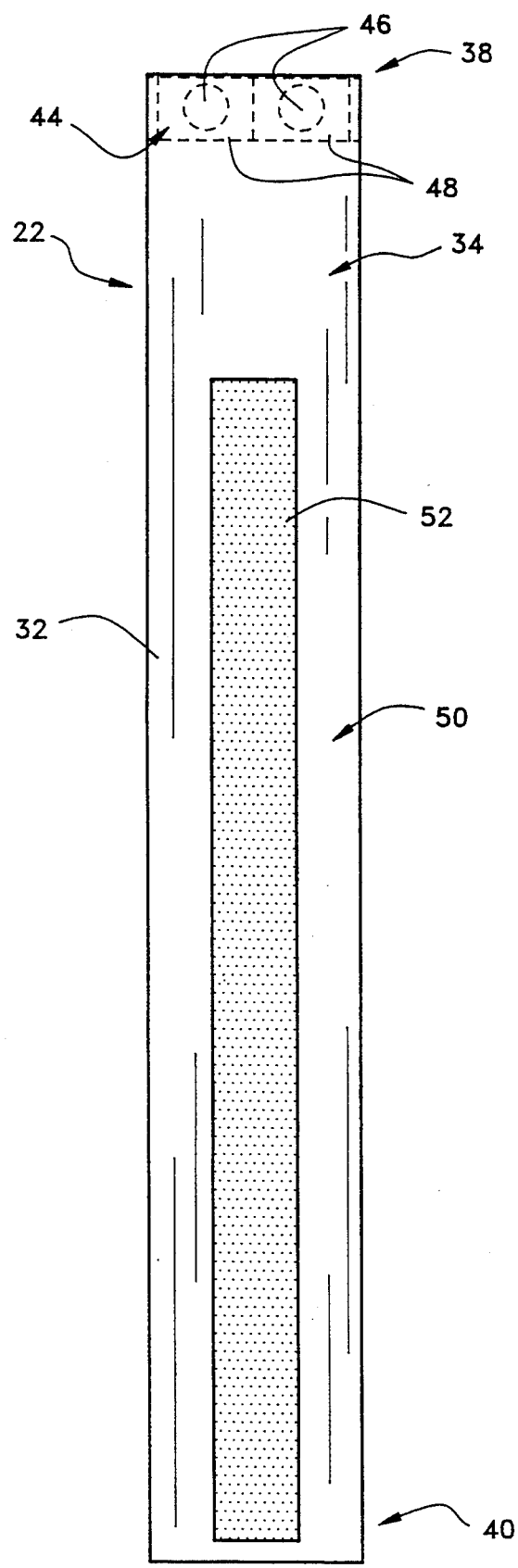
FIG. 4 is a front view of the mirror holder of FIG. 1.
Figure 5:
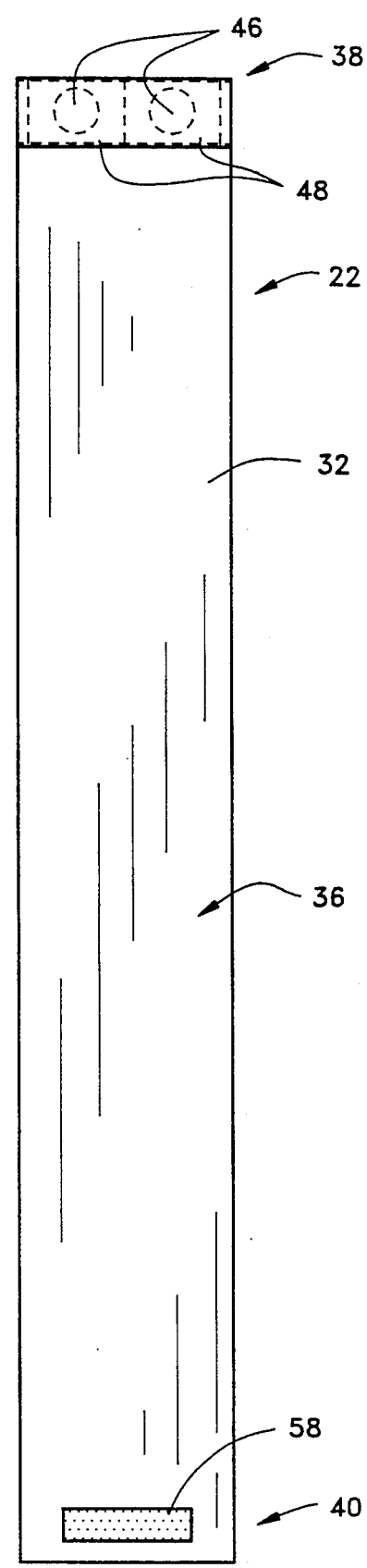
FIG. 5 is a rear view of the mirror holder of FIG. 1.

The mirror 20 illustrated is oval in shape, having an overall dimension in the longer direction of about 4 to 6 inches, and most preferably about 5 inches, and a dimension in the shorter direction of about 3 to 5 inches, and most preferably about 4 inches. The mirror 20 need not be oval, however, but could be square, circular, or any other shape which provides an adequate reflective surface. Further, while the mirror 20 described includes a base and reflective member, the mirror 20 may simply comprise a thick standard glass or plastic mirror not having a base. As illustrated in detail in FIGS. 4 and 5, the holder 22 preferably comprises an elongate strap 32 having a first side 34, second side 36, first end 38 and second end 40. The strap 32 preferably comprises a flexible, lightweight and durable material such as a fabric. A beaded cotton/polyester or similar fabric is believed suitable. Edging or binding 42 located about the edges of the strap 32 prevents fraying or excessive wear on the edges of the strap 32. The strap 32 is preferably about 30–40 inches long, and most preferably about 34 inches long, and about 3–7 inches, and most preferably about 5 inches wide.

The holder 22 includes weight means 44 at the first end 38 of the strap 32. The weight means 44 preferably comprises two weights 46 having some degree of mass. The weights 46 may comprise small metal members. Preferably, each of the weights 46 is secured to the first end 38 by folding a portion of the strap 32 over upon itself and sewing the folded material into two pockets 48, each having a weight 46 therein.

By way of example, each of the weights 46 preferably has a mass of 0.5 ounce or so, and comprise a thin metal piece of no particular shape. When the members have a maximum outer dimension of about 1 inch, about a 1–2 inch length of the material that comprises the strap 32 is folded backwards from the first side 34 to the second side 36. The weights 46 are located underneath the fold of material on the second side 36 equidistant from one another and the outer edges of the strap, and the folded material is stitched or sewn along the edges to close the fold about the strap 32 and form a single pocket. Stitching is then placed between the weights 46 to form two separate pockets 48.

It is possible to use a single weight 46, or greater than two weights 46 to comprise the weight means 44. Further, the weights 46 may comprise of any type of material, such as metal or even rock, as long as the material is durable and has high density such that significant mass is achieved in little volume. It is also possible to attach the weight means 44 to the strap 32 in a variety of manners, such as with glue, snaps, clamps or the like. Preferably, the above method is used, as the material which comprises the strap 32 surrounds the weights 46, preventing the weights 46 from being lost or separated from the strap 32, and preventing them from scratching a mirror or other goods that might come into contact with the holder 22.

The exact total mass of the weights 46 may vary. In particular, the total mass (and thus the size and weight of the weights 46) is chosen in relation to the mass of the remainder of the holder 22 and the mirror 20 connected thereto. As illustrated in FIG. 1, the total mass of the weights 46 must be such that when the first end 38 of the holder 22 hangs over a door, the holder 22 remains in place even with the mirror 20 attached. Most preferably, the mass of the weights 46 is chosen such that when the first end 38 is placed on a flat surface, such as a window sill or the like, with the remainder of the holder 22 (including the mirror 20 attached thereto) hanging downwardly towards the ground, and the holder 22 remains in place. The above-stated goals should be met when the holder 22 is placed on a surface with a normal friction coefficient.

Most preferably, the holder 20 includes means 50 for securing the mirror 20 to it. Most preferably, the means 50 comprises interengaging fastening means located on the mirror 20 and strap 32. Preferably, these means 50 comprise hook and loop attachment means, also known under the tradename "Velcro." More particularly, the first side 34 of the strap 32 includes an elongate strip or section 52 of "Velcro." This strip 52 preferably extends from near the first end 38 of the strap 32 to near the second end 40. In any case, the strip 52 should extend along a sufficient length of the strap to provide a wide range of height adjustment for the mirror 20. When located on a strap having the dimensions set forth above, the strip or section 52 most preferably extends from about 6–7 inches from the edge of the strap 32 at the first end 38 to about 0.5 inches from the edge of the strap 32 at the second end 40. The strip 52 is preferably about 0.5–3 inches wide, and most preferably about 2 inches wide, and centered on the strap 32. The strip 52 is preferably attached to the holder 22 by sewing or stitching or the like.

Interengaging fastening means, preferably in the form of a hook and loop member 54 are located on the second side 26 of the mirror 20. The member 54 is preferably a section of "Velcro" material small enough to be hidden on the second side 26 of the mirror 20, but large enough to allow easy connection of the mirror to the mating "Velcro" material located on the strap 32. The member 54 is preferably attached to the mirror 20 through use of adhesive, such a glue or a very strong double-sided adhesive tape.

If the rear side 26 of the mirror 20 is a reflective or magnifying surface, then the member 54 preferably comprises a strip of Velcro or similar material located at or along the edge of the mirror. Further, attachment means are also preferably located on the first side 24 of the mirror 20 in that instance, so that a user may attach to the holder 22 for use of the second side of the mirror.

Figure 6:
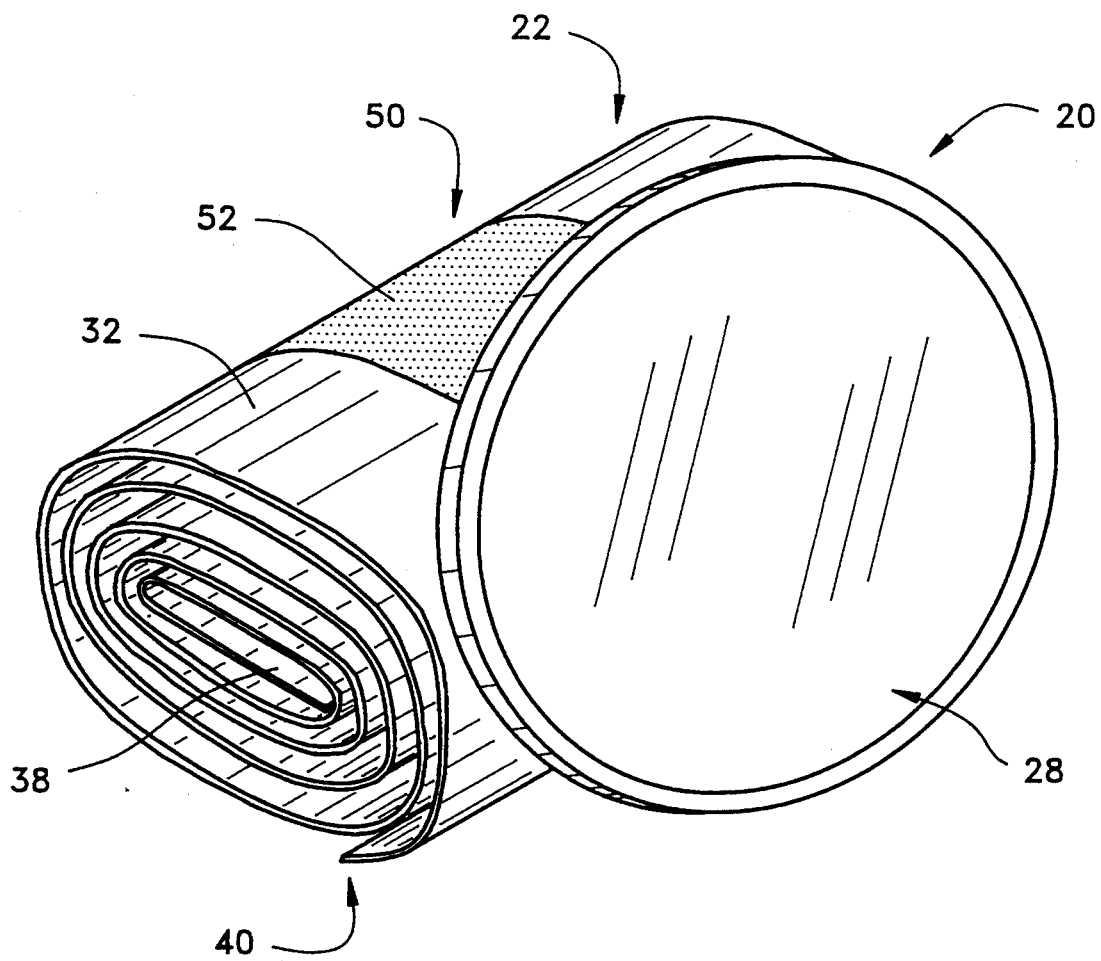
FIG. 6 illustrates the mirror holder of FIGS. 4 and 5 in a coiled position supporting the mirror of FIGS. 2 and 3.

Advantageously, as illustrated in FIGS. 1 and 6, the means for securing 50 allows the mirror 20 to be easily (and removeably) attached to the holder 22. Several other means for securing 50 are contemplated. For example, a row of snaps or other clamps located on the strap 32 might be used. In such instances, the mirror 20 might include a mating snap or a special clamping surface.

Lastly, attachment means, preferably in the form of a small section 58 of interengaging hook and loop material or "Velcro," are located at the second end 40 of the strap 32 on the second side 36 thereof. The attachment means maintains the strap 32 in a coiled position, as described in more detail below in conjunction with FIGS. 6 and 7. This section 58 is preferably only about 0.5–1 inch in width and 2–3 inches long, and is located as near the edge of the strap 32 at the second end 40 thereof as possible. Once again, this section 58 of material could be replaced with a snap or other clamp, but the flexible, soft hook and loop material is preferred.

Figure 7:
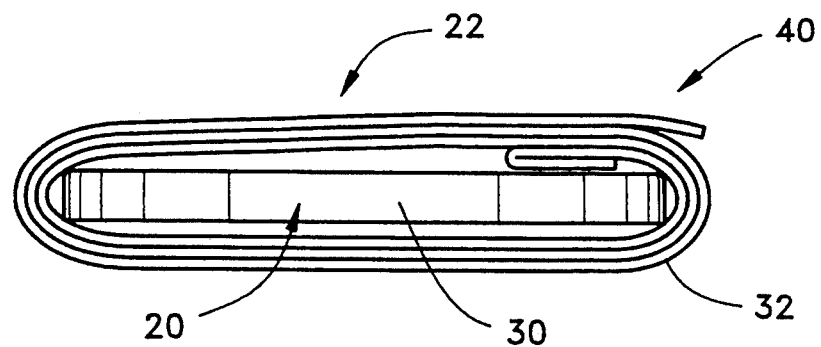
FIG. 7 illustrates the mirror of FIGS. 2 and 3 contained within the coiled up mirror holder.

The use of the present invention will now be described in conjunction with FIGS. 1-7. For traveling and storage and the like, the coiled strap 32 encompasses the mirror 20 as illustrated in FIG. 7. In order to arrange the mirror 20 and strap 32 in this fashion, a user first lays the strap 32 out on a flat surface, first side 34 facing down. The user then attaches the mirror 20 to the strap 32 with the means for securing 50, preferably near the first end 36. From this end, the user coils the strap 32 up. When completed, the strap 32 effectively protects the mirror 20 with a cushion of material. Further, the holder 22 is maintained in the coiled position about the mirror 20 because the section 58 of "Velcro" at the second end 40 contacts and mates with the strip 52 of "Velcro" on the first side 34 of the strap 32.

When a user desires to use the mirror 20, the user uncoils the strap 32 from around the mirror 20. The user places the first end 38 of the strap 32 over a door, as illustrated in FIG. 1, or on a ledge or other surface. At the same time, the second end 40 of the strap 32 dangles from, or hangs freely downwardly toward the floor. When the user uncoils the strap 32 and hangs it, the mirror 20 and strap 32 are already connected. The user can adjust the mirror 20 to the proper height, however, merely by detaching and re-attaching it anywhere along the strap 32.

Because of the weight means 44, the holder 22 supports the mirror 20 without the need to permanently attach the strap 32 to the particular surface from which the holder hangs. Further, the weight means 44 are sufficiently heavy to provide adequate support for the strap 32 when the first end 38 is merely resting on a flat surface, or when placed over the top of a surface, such as a door, and hanging freely downward. Further, because of the thinness of the strap 32, the holder 22 may be left in place allowing, in many instances, the door on which it is located to be partially or completely closed. The thinness of the holder 22 eliminates the need to move the holder 22 every time the door is opened or closed.

Lastly, it is possible to use the mirror 20 on a flat surface as well, such as a desk or table. A user simply detaches the mirror 20 from the strap 32, and coils the strap 32 up upon itself starting with the first end 38 and with the first side 34 facing downwardly. Once coiled, the "Velcro" section 58 on the second side 36 of the strap contacts the strip 52 on the first side 38, maintaining the strap 32 in its coiled position. The user places the coiled-up strap 32 on a flat surface and attaches the mirror 20 to the strap 32 with the securing means 50, as illustrated in FIG. 6.

It will be understood that the above described arrangements of apparatus and the method therefrom are merely illustrative of applications of the principles of this invention and many other embodiments and modifications may be made without departing from the spirit and scope of the invention as defined in the claims.

I claim:

1. In combination, a mirror having a front reflective surface and a rear surface, and first interengaging fastening means secured to the rear surface of the mirror;
   an elongate, flexible mounting strap for suspending the mirror above a horizontal surface;
   weight means mounted at an end portion of the strap; and
   second interengaging fastening means, adapted to releasably engage the first interengaging fastening means, extending along a length of the mounting strap such that the mirror can be attached at various locations along the mounting strap.

2. The combination of claim 1 wherein said weight means comprise metal weights.

3. The combination of claim 1, wherein said first and second interengaging fastening means comprise hook and loop fastening means.

4. The combination of claim 1, wherein said strap includes a third interengaging fastening means located on the opposite side of said second interengaging fastening means, and at an end thereof, whereby when said strap is coiled upon itself, said third interengaging fastening I means engages said second interengaging fastening means for retaining the strap in the coiled position.

5. The combination of claim 2, wherein said weight means are located in at least one pocket on said strap.

6. The combination of claim 1, wherein said strap comprise a cloth material.

7. The combination of a mirror and holder for supporting the mirror comprising:
   a holder comprising a strap having a first end and a second end and a first side and a second side, said first end of said strap including at least one pocket having a weight therein, said first side having an elongate piece of interengaging hook or loop fastening material secured thereto, said strap further including a section of interengaging hook or loop fastening material secured to said second side at said second end thereof; and
   a mirror, said mirror having a first side and second side, said first side having a reflective surface, said second side including a mating interengaging hook or loop fastening material for attachment to said hook or loop fastening material on said strap.

8. The combination of claim 7, wherein said strap includes two pockets at said first end, each of said pockets containing a weight.

9. The combination of claim 8, wherein said strap includes edging located along the edges of said strap.

10. The combination of claim 8, wherein said elongate interengaging material on said strap extends substantially between the first and second ends of the strap.

11. A method of supporting a mirror for use, comprising the steps of:
    obtaining a strap having a first weighted end and interengaging fastening means on at least one side thereof;
    positioning said first end of said strap on a surface and allowing the remainder of said strap to hang downwardly from said surface; and
    securing a mirror to said strap, said mirror having a first side having a reflective surface thereon and a second side having interengaging fastening means for connection to said interengaging fastening means on said strap.

12. In combination, a mirror and holder for said mirror, comprising:
    an elongate, flexible strap having a first end and second end and first side and second side;
    first interengaging fastening means located on said first side of said strap and extending along a length of said strap;
    at least one pocket located at the first end of said strap;
    weight means located in said pocket, said weight means counterbalancing the remainder of said strap and a mirror thereon when said first end of said strap is located on a surface and said second end of said strap hangs freely downward from said surface; and a mirror, said mirror having a second interengaging fastening means located thereon for connection to said first interengaging fastening means located on said strap at various locations therealong.

* * * * *